United States Patent Office 3,282,567
Patented Nov. 1, 1966

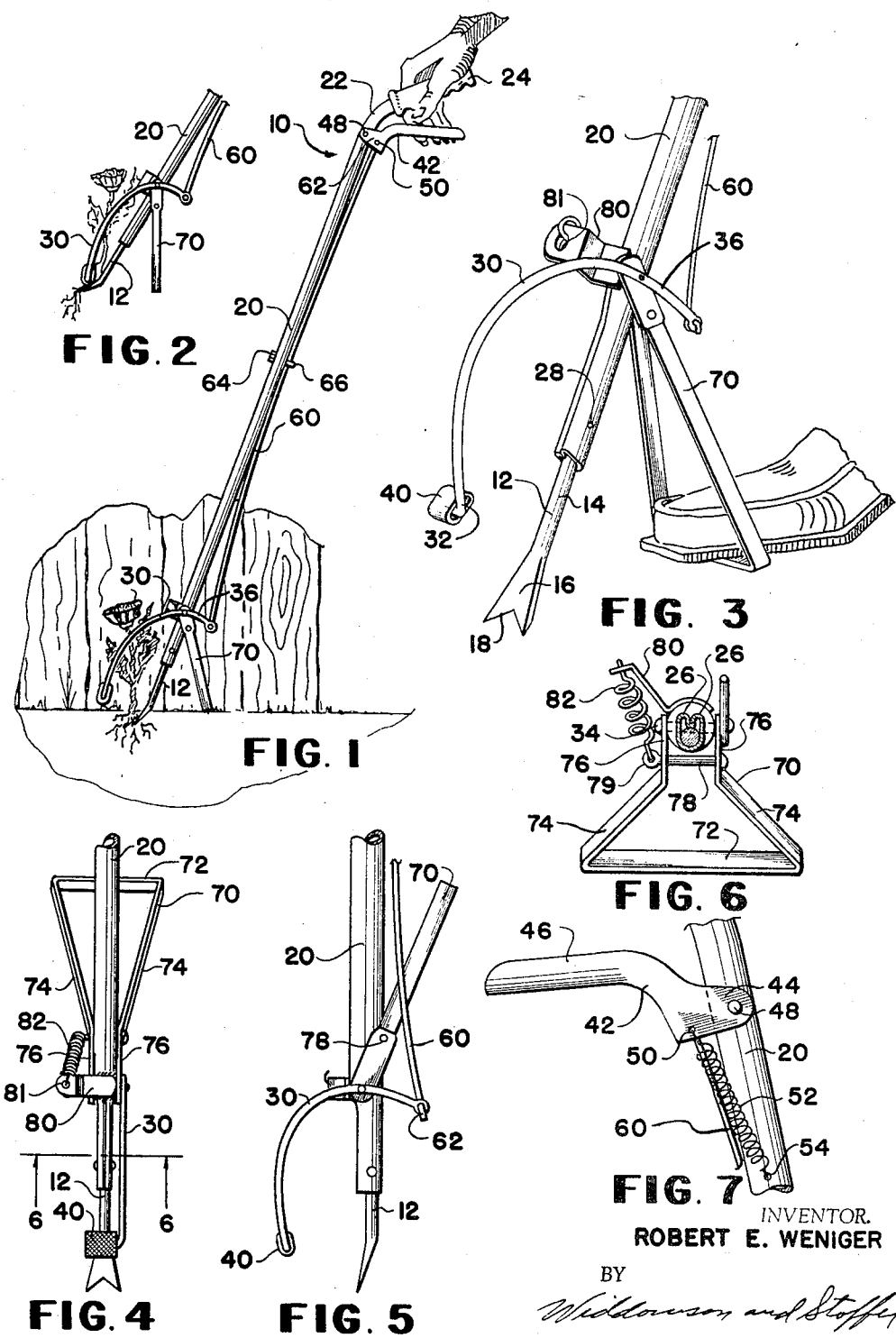

3,282,567
WEED DIGGING APPARATUS
Robert E. Weniger, 238 Brookside, Wichita, Kans.
Filed Sept. 29, 1964, Ser. No. 400,036
2 Claims. (Cl. 254—132)

This invention relates to weed control means, more particularly to an manually operative digging implement for removing weeds and the like from the ground. More particularly the invention relates to a weed digging and holding device which can be operated by a person standing in an erect position, which device has new structural features and which in use results in greater efficiency and easier operation.

Weed digging and holding devices which enable the user thereof to dig weeds and the like while assuming an errect position are old in the art. Some of these known digging devices have a clamping apparatus to hold the weed while it is being removed from the soil and transferred to a container or otherwise disposed of. Many of these known digging devices however are cumbersome and complicated making them difficult and tedious to operate. Further, in using the known digging devices of this type it is often difficult to pull the weed from the soil after it has been clamped in the device. This removal operation is particularly difficult if the root system of the weed is large and/or the soil is firm. The operation of these known digging devices under these adverse but common conditions is therefore, arduous, tiring, and boring.

I have invented a new digging device. The digging device or apparatus of my invention is a member having blade means on the lower end. A clamping means having a jaw that can engage the blade means is provided. A means to actuate the clamping means is also provided. Preferably, a fulcrum means is mounted on the shaft for applying a prying action to the blade means.

I have invented a new weed digging device that overcomes the shortcomings of weed digging devices known to the prior art. My new weed digging device is relatively light in weight due to the combination of a number of novel structural features. It is therefore easy and less tiring to operate, and is dependable in operation. It is also less expensive to manufacture. A feature of my new weed digging device is the provision of a pry stand which enables prying action to be applied to difficult to remove weeds or the like. The pry stand in use acts as a fulcrum to thereby enable the user to obtain a mechanical advantage. This feature materially reduces the effort involved in removing weeds or the like, particularly in firm and/or packed soil. In preferred specific embodiments of the weed digging device of my invention the pry stand is constructed so that it can be conveniently placed in position for immediate use. In the inoperative position the pry stand is in an out of the way location on the weed digging device allowing the device to be used in the conventional manner known to the art.

An object of this invention is to provide a new weed digging apparatus.

Another object of this invention is to provide a new weed digging and holding device which can be operated from an erect position that is light in weight, simple in operation, and dependable.

Yet another object of this invention is to provide a weed digging and holding device that will enable weeds to be removed from the ground more easily by providing a means to obtain a mechanical advantage.

Yet another object of this invention is to provide a new weed digging and holding device that is provided with a pry stand which makes possible the application of a prying action in the operation thereof.

Still another object of this invention is to provide a new weed digging device that is dependable in operation and is simple to operate.

Still another object of this invention is to provide a new weed digging device that can be manufactured at a relatively low cost.

Other objects and advantages of the new weed digging device of my invention will become apparent to those skilled in the art upon reading the disclosure. Drawings accompany and are a part of this disclosure. These drawings depict preferred specific embodiments of the new weed digging device of my invention, and it is to be understood that such drawings are not to unduly limit the scope of my invention. In the drawings, FIG. 1 is a side elevational view of a preferred specific embodiment of the new weed digging and holding apparatus of my invention.

FIG. 2 is a side elevational view of the lower portion of my weed digging apparatus illustrating the clamping arm in gripping position.

FIG. 3 is a perspective view in enlarged scale illustrating the construction detail of the weed gripping means of my invention.

FIG. 4 is a front elevational view in broken section of my invention.

FIG. 5 is a side elevational view in broken section illustrating the pry stand in non-operative position.

FIG. 6 is a cross sectional view on line 6—6 of FIG. 4.

FIG. 7 is a side elevational view in broken section illustrating specific detail of the lever element.

The following is a discussion and description of the new weed digging apparatus of my invention made with reference to the drawings, wherein the same reference numerals are used to indicate the same or similar parts and/or structure. The discussion and description is of a prefered specific embodiment of the weed digging apparatus of my invention and it is to be understood that such is not to unduly limit the scope of my invention.

Referring now to the drawings, FIGS. 1–7, there is illustrated a specific embodiment 10 of the weed digging apparatus, and elements thereof. Weed digging and holding device 10 has a spade element 12 having a rod portion 14, and a flat flared blade portion 16 having a V-shaped cutting edge 18. This spade 12 is most clearly illustrated in FIG. 3. My digging device includes an elongated tubular shaft 20 having a bent handle portion 22 on the upper end. The shaft 20 can be made of any suitable type of material, preferably metal, most preferably aluminum or other suitable metal of a relatively light weight. On the handle portion 20 is mounted a tubular shaped handle grip 24 of resilient material, preferably rubber or plastic. A means is provided to secure the spade element 12 to the lower end of shaft 20. Preferably the spade is mounted in the hollow end of shaft 20, which shaft 20 has a portion on the lower end having an inwardly extending crease forming folded portions 26 with aligned apertures therein, as most clearly illustrated in FIG. 6 of the drawings. A bolt or rivet is disposed in the apertures in the folded portions 26 to draw the creased shaft portion of shaft 20 into frictional engagement with the rod portion 14 of spade element 12. This particular structure on shaft 20 provides a very strong and sturdy arrangement for fastening the spade element 12 to the lower end of shaft 20.

A weed gripping means is provided on the weed digging apparatus of my invention. The gripping means includes an arcuate shaped clamping arm 30 with a transversely extending enlarged portion 32 on one end, a transverse shaft 34 welded or otherwise secured to the intermediate portion of the clamping arm, and an extended portion 36 having an aperture adjacent the end.

The transverse shaft 34 is positioned in an aperture in the lower portion of the shaft 20 and serves to pivotally mount the arm 30 relative to the shaft so that enlarged portion 32 will selectively engage the blade portion 16 of spade 12. Preferably a sleeve of resilient material 40 is positioned over enlarged portion 32 of clamping arm 30 making it a more effective jaw since the resilient material has a relatively high coefficient of friction. The gripping means includes a lever 42 having spaced parallel portions 44 with a pair of aligned apertures therein, and an opposite extending portion 46. A pin 48 positioned in the apertures in spaced portions 44 pivotally secure the lever 42 to the upper end of shaft 20 adjacent the handle portion 22, as indicated in FIG. 1 of the drawings. The lever 42 is also provided with a second pair of apertures 50 spaced from the first mentioned pair of apertures. An indicated in FIG. 7, a coil type tension spring 52 having hooked ends is attached to the lever 42 and the shaft 20. One hooked end of spring 52 is positioned in one of the apertures 50 in lever 42 and the other end hooked in aperture 54 in shaft 20. This spring 52 biases the lever 42 into a spaced position relative to handle portion 22. A link 60 is connected to lever 42 and clamping arm 30. As indicated in FIG. 1 of the drawings, the upper end of link 60 is connected to lever 42 through aperture 50 and the lower end is connected to the aperture in the extending portion 36 of clamping arm 30. Preferably each end of the link 60 has a transverse portion joined to a longitudinally extending portion 62. This end portion on link 60 enables the link to be quickly and conveniently attached to the lever and clamping arm. A cotter pin or a bolt 64 having an eyelet 66 is disposed in an aperture in the intermediate portion of shaft 20 with the link 60 disposed in the eyelet 66. Bolt 64 maintains the central portion of the link 60 in close proximity to the shaft 20.

A pry stand 70 is pivotally mounted on the lower portion of shaft 20. The pry stand 70 has a flat base portion 72, inwardly inclined side portions 74, and parallel end portions 76 with a first pair of aligned apertures adjacent the ends therof and a second pair of aligned apertures spaced from the ends. As indicated in FIG. 6, the transverse shaft 34 on clamping arm 30 is disposed through the aligned pair of apertures in the ends of the pry stand 30 and through the aperture in the lower portion of shaft 20. This arrangement pivotally secures the pry stand 30 to the shaft. A pin 78 having an eyelet 79 is positioned in the second set of apertures spaced from the ends of the parallel end portions 76 of pry stand 70. Pin 78 serves as a stop for the pry stand 70 and engages the shaft 20 in both the downwardly extended position, as shown in FIG. 3, and the upwardly extended position, as shown in FIG. 5. An extending bracket 80 having an end aperture 81 is secured to the shaft 20. A coil type tension spring 82 has one end secured to the eyelet 79 of pin 78 and the other end secured in the aperture 81 in bracket 80. The tension spring 82 maintains the pry stand in either the downwardly extending operative position, or the upwardly extending non-operative position. As is believed apparent, the spring 82 provides a snap action to selectively maintain the pry stand in either of the two aforementioned positions. The digging and holding device of my invention is adapted in use to remove weeds and the like when the spade element 12 is inserted in the soil adjacent a weed, the clamping arm 30 is actuated by manipulating lever 42 to thus move enlarged portion 32 in close proximity to the spade element, and a prying action applied using the pry stand 70 as a fulcrum. As can be appreciated, the pry stand 70 enables the user to achieve a mechanical advantage in applying a pulling force to the weed so clamped in the apparatus.

As will be obvious to those skilled in the art, various changes and modifications of the preferred weed digging and holding device of my invention as disclosed herein can be made or followed without departing from the spirit of the disclosure or from the scope of the claims.

I claim:

1. A weed digging and holding device comprising, a spade element having a rod portion, and a flat flared blade portion provided with a V-shaped cutting edge integrally joined to said rod portion, an elongated tubular shaft having a curved handle portion on the upper end, a tubular shaped handle grip of resilient material on said handle portion, a means to secure said space element to the lower portion of said shaft comprising, a creased portion on the lower end of said shaft having opposed folded portions with aligned apertures therein, a rivet disposed in said apertures to force the creased shaft portion into frictional engagement with the rod portion of said space element, a gripping means having an arcuate shaped clamping arm, a transversely extending enlarged portion on one end, a sleeve of resilient material disposed about said transversely extending portion, a transverse shaft welded to an intermediate portion of clamping arm and positioned in an aperture in the shaft to pivotally mount said arm on said shaft to enable said transverse portion to selectively grip weeds and the like between same and said spade, said clamping arm having an aperture on the end opposite said transverse portion, a lever mounted adjacent said handle, said lever having spaced parallel portions with a first pair of aligned apertures adjacent the ends, a second pair of apertures spaced inwardly from said first pair of apertures, and an extending elongated opposite end, a first pin disposed in the first pair of apertures and an aperture in said shaft pivotally mounting said lever on said shaft adjacent the upper end thereof with said extending opposite end portion of said lever positioned adjacent said handle grip, a link having on each end thereof a transverse portion joined to a longitudinal portion, one end of said link pivotally disposed in one of said second apertures on said lever, and the other end disposed in the end aperture of said clamping arm, a first coil-type tension spring having hooked ends, one of said hooked ends disposed in the other of said second apertures on said lever, and the other of said hooked ends disposed in an aperture in the intermediate portion of said shaft, a bolt having an eyelet disposed in an aperture in the intermediate portion of said shaft with said link disposed in said eyelet, a pry stand on said shaft having a flat base portion, inwardly inclined side portions and spaced parallel end portions having a third pair of aligned apertures adjacent the ends and a fourth pair of aligned apertures spaced from the ends, said transverse shaft on said clamping arm disposed in said third pair of apertures thereby pivotally mounting said pry stand on said shaft, a pin having an eyelet disposed in said fourth pair of apertures, an extending bracket having an end aperture secured to said shaft, a coil-type tension spring having one end secured to said eyelet and the other end secured to the extending end of said bracket, said digging and holding device adapted in use to remove weeds and the like when said spade element is inserted in the soil adjacent a weed or the like, the clamping arm closed against the spade with the lever, and a prying action applied using the pry stand as a fulcrum.

2. A weed digging and holding device comprising, a spade element having a rod portion, and a flat blade portion provided with a cutting edge, an elongated tubular shaft having a handle portion on the upper end, a tubular shaped handle grip of resilient material on said handle portion, means to frictionally secure said space element to the lower portion of said shaft, a clamping means comprising, a clamping arm, an enlarged portion on one end of said clamping arm, a transverse shaft secured to the intermediate portion of said clamping arm and positioned in an aperture in the shaft to pivotally mount said arm on said shaft, a lever pivotally mounted adjacent said handle, said lever having a bifurcated portion with a pair of aligned apertures therethrough, a pin means disposed in said pair of apertures in said lever and in an aperture in said shaft pivotally mounting said lever on said shaft adjacent the handle portion thereof, a link means, connection means on one end of said link pivotally connecting same to said lever at a point spaced from said aligned apertures, a second connection means on the opposite end of said link connecting same to the end of said clamping arm opposite said enlarged portion, first spring means secured to said lever for biasing said clamping arm in open position, a pry stand on said shaft having a base portion, and spaced end portions having aligned apertures therein, a pin means positioned in said aligned apertures in said pry stand and in an aperture in said shaft pivotally securing same to said shaft, an extending bracket on said shaft, a second spring means secured to said extending bracket and said pry stand, a stop means on said pry stand limiting movement of same relative to said shaft, said digging and holding device adapted in use to remove weeds and the like when said spade element is inserted in the soil adjacent a weed or the like, the clamping arm closed against the spade with said lever, and a prying action applied using the pry stand as a fulcrum.

References Cited by the Examiner
UNITED STATES PATENTS 2,349,621  5/1944  Hardman ---------- 254—132
2,749,088  6/1956  Jennens ---------- 254—132

FOREIGN PATENTS 806,499  6/1951  Germany.

WILLIAM FELDMAN, *Primary Examiner.*
OTHELL M. SIMPSON, *Examiner.*

UNITED STATES PATENT OFFICE
CERTIFICATE OF CORRECTION

Patent No. 3,282,567                                             November 1, 1966

Robert E. Weniger

It is hereby certified that error appears in the above numbered patent requiring correction and that the said Letters Patent should read as corrected below.

Column 1, line 7, for "an" read -- a --; column 3, line 17, for "An" read -- As --; column 4, lines 10, 16, and 67, for "space", each occurrence, read -- spade --.

Signed and sealed this 5th day of September 1967.

(SEAL)
Attest:

ERNEST W. SWIDER                                     EDWARD J. BRENNER
Attesting Officer                                         Commissioner of Patents